2,928,804

PROCESS FOR CURING POLYMERIZABLE ESTERS IN PRESENCE OF ORGANIC HYDROPEROXIDE AND METALLIC DRIERS

Geoffrey Lambsin Foster, Maidenhead, and Peter Francis Nicks, Holyport, England, assignors to Imperial Chemical Industries Limited, London, England, a corporation of Great Britain No Drawing. Application September 19, 1955
Serial No. 535,266

Claims priority, application Great Britain
September 22, 1954

3 Claims. (Cl. 260—45.4)

This invention relates to the curing of polymerisable esters whose polymerisation is inhibited by the presence of oxygen.

The polymerisable esters with which we are concerned in this invention include monomeric esters of methacrylic and acrylic acid and polyesters derived from a polyhydric alcohol, a dicarboxylic acid and methacrylic or acrylic acid, for example, resins described in British Patent 607,888, having the general formula:

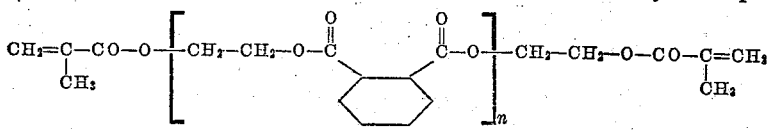

where $n$ is 0 or a small positive integer, i.e. between 0 and 5.

It is known that polymerisable polyesters, having dissolved in them polymerisable substances such as styrene or a diallyl ester or certain methacrylates, can be gelled in the presence of organic peroxides, and for example, cobalt naphthenate. Naphthenates and similar salts of metals other than cobalt have also been used, including lead, iron, copper and manganese. All of these salts are known as "driers." It is also known to use a hydroperoxide and a "drier" to cure certain mixtures comprising a copolymerisable mixture of one or more alkyd resins comprising an $\alpha,\beta$-unsaturated acid and one or more substances comprising the $CH_2=C<$ group. This latter process is stated to effect curing at room or higher temperatures.

The present invention concerns a method of overcoming the characteristic air inhibition of polymerisable methacrylate and acrylate esters. For example, it is known that with certain resins used in laminated productions the curing process in the exposed layers is inhibited by the presence of atmospheric oxygen. Similar difficulties arise when coatings are formed comprising polymerisable methacrylate and acrylate esters.

We have now found that the air inhibition associated with polymerisable methacrylate and acrylate esters can be overcome by effecting the curing of the esters in the presence of a hydroperoxide curing catalyst, a "drier" and in addition a compound containing the allyloxymethyl group $CH_2=CH.CH_2-O-CH_2-$. Catalysts include aliphatic, aromatic and cycloaliphatic hydroperoxides and examples of such catalysts for use with the additive include cyclohexyl hydroperoxide, methyl ethyl ketone hydroperoxide, di-isopropyl benzene hydroperoxide, paramenthane hydroperoxide, tertiary butyl hydroperoxide and cumene hydroperoxide. The most satisfactory catalysts from the view point of efficiency are cyclohexyl hydroperoxide and methyl ethyl ketone hydroperoxide. Satisfactory "driers" for use in the invention include cobalt or lead naphthenates. Examples of the additive, include polyesters of the $\alpha$-allyl ether of glycerol and a dibasic acid, in particular the phthalic acid ester of the $\alpha$-allyl ether of glycerol, the succinic acid ester of the $\alpha$-allyl ether of glycerol; allyloxyisopropyl methacrylate and allyloxymethyl methacrylate. Of these we find the polyesters of the succinic acid ester of the $\alpha$-allyl ether of glycerol and the phthalic acid ester of the $\alpha$-allyl ether of glycerol to be the most suitable since they are non volatile at normal temperatures and do not decrease the viscosity of the laminating resin. A further important practical advantage is that they are relatively odourless whereas some of the monomeric compounds possess pungent lachrymatory odours which can make their usage unpleasant. The proportion of additive used with the polymerisable methacrylate and acrylate esters can be varied between fairly wide limits but we find additions which give surface coatings of the order of 4–16 mgms. additive per square inch of surface in contact with air to be most useful. This is equivalent to an addition of 5–20% by weight of additive based on weight of polymerisable ester in the surface film. The viscosity of the preferred polyester additives is high and the molecular weight of these additives is preferably between 7000 and 10,000.

A possible explanation of our invention is that the allylic compound absorbs atmospheric oxygen at a rate greater than the rate at which oxygen diffuses, by solution, into the system hence the actual curing reaction takes place under substantially anaerobic conditions.

Some support for this theory is to be found in the fact that it is known that the formation of hydroperoxides by addition of oxygen to allylic compounds is a facile reaction. More particularly, compounds containing the allyloxymethyl group in which the methylene groups adjacent to the ether oxygen are very prone to attack by oxygen with the resultant formation of hydroperoxides.

It is possible that the "driers" assist our additives in overcoming air inhibition but they are not effective themselves in the absence of our additive.

For the preparation of laminated materials the additive can be mixed with the bulk of the laminating resin or a solution in, for example, glycol dimethacrylate may be sprayed or brushed onto the outer layer of the laminated body. A third procedure involves the mixing of the additive with the laminating resin used to impregnate the outer layers of the laminate.

The catalyst and "drier" may be added to the methacrylate polyester resin before the allyloxymethyl group containing compound or the three compounds may be added individually or all together as a mixture. The glycol dimethacrylate can be used if necessary and is a polymerisable solvent.

Our invention is illustrated by the following examples in which parts are expressed by weight.

Example I

A nineteen layer laminate was prepared on a solid former using loom state glass cloth and impregnating throughout with resin A:

Resin A:
    Ethylene glycol methacrylate/phthalate resin prepared as described in Example 7 of British Patent 607,888 _____ 90
    The phthalic acid ester of the $\alpha$-allyl ether of glycerol _____ 10

Cyclohexyl hydroperoxide _____ 4
Lead and cobalt naphthenates (.24% and .06% respectively by weight of resin calculated on the metal).

Example 7 of British Patent 607,888 reads as follows:
2.5 parts concentrated sulphuric acid, 124 parts ethylene glycol (2 mols.), 148 parts phthalic anhydride (1 mol.), 300 parts trichloroethylene were charged into a well-stirred glass vessel from which water could be removed by azeotropic distillation, the trichloroethylene being returned to the vessel after condensation. When 18 parts of water had been removed the reaction mixture was cooled to room temperature and 172 parts methacrylic acid and 8 parts hydroquinone disulfonic acid added. The azeotropic distillation was then continued accompanied by the bubbling of a stream of air through the mixture until all the water (36 parts) had been removed.

20 parts of anhydrous sodium carbonate were added and the mixture obtained stirred for half an hour. The mixture was filtered through a small pressure filter and the filtrate transferred to an enameled vessel from which the trichloroethylene was removed by distillation under reduced pressure so that the temperature of the solution did not rise above 50° C. A pale yellow viscous liquid consisting essentially of dimethacrylic esters of low molecular weight dihydroxy glycol phthalate was obtained. The laminate was exposed to the air and the surface was tack free in six hours.

*Example II*

A nineteen layer laminate was prepared as follows. Fifteen layers of glass cloth were impregnated with resin B and each laid on the solid former. The top four layers of glass cloth were then each impregnated with resin A and added to the original fifteen layers.

100 parts by wt. resin B:
  Ethylene glycol methacrylate/phthalate resin as used in Example I.
  "Drier" and catalysts as in Example I.

The laminate cured satisfactorily and the surface was found to be tack free in six hours.

*Example III*

Example I was repeated using in place of the phthalic acid ester of the α-allyl ether of glycerol, the succinic acid ester of the α-allyl ether of glycerol, and similar results were obtained.

*Example IV*

A similar ten layer laminate was prepared using resin B throughout. When prepared, the exposed surfaces of the laminate were sprayed with a solution containing:
Solution C:
  Glycol dimethacrylate _____ 90
  The phthalic acid ester of the α-allyl ether of glycerol _____ 10

The solution formed a film about 5 thou. inch thick and the laminate appeared to be cured satisfactorily and the surface was again tack free in six hours.

*Example V*

Example IV was repeated using the succinic acid ester of the α-allyl ether of glycerol in place of the phthalic acid ester of the α-allyl ether of glycerol and similar results were obtained.

*Example VI*

A ten layer laminate was prepared as in Example IV. The surface was brushed with solution C. Results were again satisfactory, the applied film being of the order of 10 thou. inch thick.

*Example VII*

A ten layer laminate was prepared as described in Example IV. The surface of the laminate was brushed with resin A. Results were again satisfactory and the film comparable with that obtained in Example VI.

It is essential, when employing the coating techniques, that the exposed surface of the methacrylate polyester resin containing mass be completely covered with the solution containing the additive if the air inhibition characteristics of the methacrylate polyester resins are to be overcome. The process as used in Examples IV, VI and VII has the advantage that the amount of additive required to overcome the air inhibition is very small and has been shown to be of the order of 9 mgm. of additive per square inch of laminate.

Our invention is also applicable to coating and impregnating compositions where air inhibition is in some cases a problem.

*Example VIII*

A sample of resin A was poured onto tinplate to form a thin film. This film cured satisfactorily in six hours.

*Example IX*

A further sample of resin A was stored in a 3" x 1" tube open at one end and this cured to a hard, tack-free, state in five hours.

*Example X*

A solution of 50 parts of the phthalic acid ester of the α-allyl ether of glycerol and 50 parts of methyl methacrylate was treated with catalyst and "drier" as in the above examples. A sample was brushed onto tinplate and the film cured in air in three and a half hours to give a good, hard, tough, film.

*Example XI*

Example X was repeated using in place of methyl methacrylate, glycol dimethacrylate. A similar result was obtained except that the film took about four and a half hours to cure.

What we claim is:

1. In a process for curing a polymerizable ester of the formula:

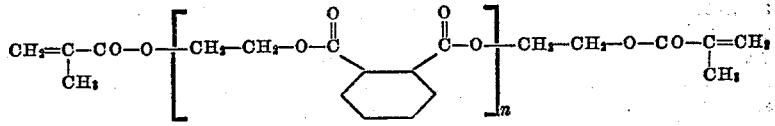

wherein n is a positive integer between 0 and 5, in the presence of a catalyst selected from the group consisting of aliphatic, aromatic and cycloaliphatic hydroperoxide curing catalysts, and a metallic salt drier, the improvement which comprises incorporating therewith an amount of from 5 to 20%, by weight of said ester, of a polyester of the phthalic acid ester of the α-allyl ether of glycerol, having a molecular weight between 7,000 and 10,000.

2. In a process for curing a polymerizable ester having the general formula:

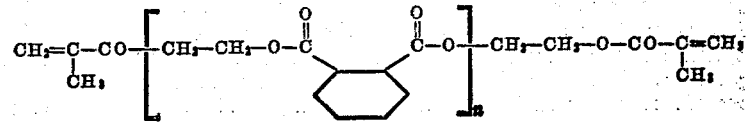

wherein $n$ is a positive integer between 0 and 5, in the presence of a catalyst selected from the group consisting of aliphatic, aromatic, and cycloaliphatic hydroperoxide curing catalysts, and a metallic salt drier, the improvement which comprises incorporation therewith an amount of from 5 to 20%, by weight of said ester, of a dibasic acid ester of the α-allyl ether of glycerol.

3. In a process for curing a polymerizable ester having the general formula:

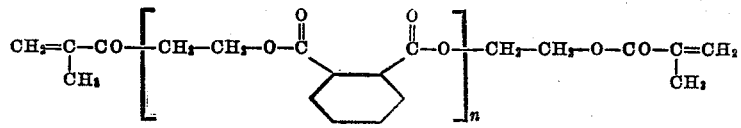

wherein $n$ is a positive integer between 0 and 5, in the presence of a catalyst selected from the group consisting of aliphatic, aromatic, and cycloaliphatic hydroperoxide curing catalysts, and a metallic salt drier, the improvement which comprises incorporating therewith an amount of from 5 to 20%, by weight of said polymerizable ester, of the phthalic acid ester of the α-allyl ether of glycerol.

References Cited in the file of this patent

UNITED STATES PATENTS

| | | |
|---|---|---|
| 2,399,214 | Evans | Apr. 30, 1946 |
| 2,437,508 | D'Alelio | Mar. 9, 1948 |
| 2,594,825 | Tawney | Apr. 29, 1952 |
| 2,642,410 | Hoppens | June 16, 1953 |
| 2,852,487 | Maker | Sept. 16, 1958 |